United States Patent [19]

Yoshioka et al.

[11] Patent Number: 5,186,005
[45] Date of Patent: Feb. 16, 1993

[54] INTERNAL COMBUSTION ENGINE WITH A DUAL TURBOCHARGER SYSTEM

[75] Inventors: Mamoru Yoshioka, Susono; Toshihisa Sugiyama, Gotenba; Toru Kidokoro, Susono, all of Japan

[73] Assignee: Toyota Jidosha Kabushiki Kaisha, Aichi, Japan

[21] Appl. No.: 666,067

[22] Filed: Mar. 7, 1991

[30] Foreign Application Priority Data

Mar. 9, 1990 [JP] Japan .................. 2-256494
Mar. 12, 1990 [JP] Japan .................. 2-57978

[51] Int. Cl.⁵ .......................................... F02B 37/12
[52] U.S. Cl. .......................................... 60/600; 60/612
[58] Field of Search ......................... 60/600, 612

[56] References Cited

U.S. PATENT DOCUMENTS

| | | |
|---|---|---|
| 3,038,297 | 6/1962 | Kauffmann . |
| 4,474,008 | 10/1984 | Sakurai et al. . |
| 4,781,027 | 11/1988 | Richter et al. . |
| 4,793,140 | 12/1988 | Esch .................. 60/612 X |
| 4,982,567 | 1/1991 | Hashimoto et al. . |
| 5,003,781 | 4/1991 | Shibata et al. . |
| 5,005,359 | 4/1991 | Tashima et al. .......... 60/612 X |
| 5,035,114 | 7/1991 | Shibata . |
| 5,036,663 | 8/1991 | Akagi et al. ................ 60/612 |

FOREIGN PATENT DOCUMENTS

| | | |
|---|---|---|
| 334228 | 9/1989 | European Pat. Off. . |
| 145328 | 8/1984 | Japan . |
| 169630 | 9/1985 | Japan .................. 60/612 |
| 259722 | 12/1985 | Japan . |
| 3158614 | 12/1989 | Japan . |

Primary Examiner—Michael Koczo
Attorney, Agent, or Firm—Cushman, Darby & Cushman

[57] ABSTRACT

An internal combustion engine with a dual turbocharger system which includes an engine, a first and a second turbocharger arranged in parallel with each other, an intake switching valve located downstream of a compressor of the second turbocharger, an exhaust switching valve located downstream of a turbine of the second turbocharger. The engine operation is changed between a "one-turbocharger-operation" wherein only the first turbocharger is operated and a "two-turbocharger-operation" wherein both the first turbocharger and the second turbocharger are operated. Change from the "one-turbocharger-operation" to the "two-turbocharger-operation" is performed on the basis of an intake air quantity, and change from the "two-turbocharger-operation" to the "one-turbocharger-operation" is performed on the basis of an engine speed. This type of change suppresses a torque shock at shift changing during acceleration and improves the drive feeling.

12 Claims, 8 Drawing Sheets

INTERNAL COMBUSTION ENGINE WITH A DUAL TURBOCHARGER SYSTEM

BACKGROUND OF THE INVENTION

1. Field of the Invention

The present invention relates to an internal combustion engine with a dual turbocharger system having a first turbocharger and a second turbocharger in which the engine operation can be changed between a "one-turbocharger-operation," wherein only the first turbocharger is operated, and a "two-turbocharger-operation," wherein both the first turbocharger and the second turbocharger are operated.

2. Description of the Prior Art

As illustrated in FIG. 10 (Prior Art), a conventional turbocharged internal combustion engine 1' is provided with a first turbocharger 7' and a second turbocharger 8' having turbines 7a' and 8a', respectively, and compressors 7b' and 8b', respectively. An exhaust switching valve 17' is installed in an exhaust conduit 20b' downstream of the turbine 8a'. Similarly, an intake switching valve 18' is installed in an intake conduit 14b' downstream of the compressor 8b'. Further, an intake bypass valve 33' is installed in an intake bypass conduit 13' bypassing the compressor 8b'. The intake switching valve 18' and the exhaust switching valve 17' are closed at small to medium intake air quantities to produce a "one-turbocharger-operation" wherein only the first turbocharger 7' is operated. The intake switching valve 18' and the exhaust switching valve 17' are opened at large intake air quantities to produce a "two-turbocharger-operation" wherein both the first turbocharger 7' and the second turbocharger 8' are operated.

Japanese Patent Publication SHO 59-145328 discloses changing the engine operation between the "one-turbocharger-operation" and the "two-turbocharger-operation" on the basis of an intake air quantity only. For reference, FIG. 6 illustrates making this change only on the basis of an intake air quantity. Further, Japanese Patent Publication SHO 60-259722 discloses changing the engine operation between the "one-turbocharger-operation" and the "two-turbocharger-operation" on the basis of an engine speed only. For reference, FIG. 7 illustrates making this change only on the basis of an engine speed.

However, in the case of changing the engine operation only on the basis of an intake air quantity, as illustrated in FIG. 8, whenever a gear position change of the transmission occurs during acceleration, the intake air quantity Q, which corresponds to the engine speed NE, momentarily decreases and causes the engine operation to change from the "two-turbocharger-operation" to the "one-turbocharger-operation". During subsequent acceleration, the "one-turbocharger-operation" quickly changes to the "two-turbocharger-operation" and a sudden decrease in the charging pressure occurs. This decrease in the charging pressure causes a torque shock and degrades the drive feeling. This torque shock occurs frequently during acceleration and the durability of the switching valves is decreased. In contrast, a change from the "two-turbocharger-operation" to the "one-turbocharger-operation" is not accompanied by such a decrease in the charging pressure and a great torque shock.

Where the operational change between the "one-turbocharger-operation" and the "two-turbocharger-operation" is made only on the basis of an engine speed, the changes between the "one-turbocharger-operation" and the "two-turbocharger-operation" will occur frequently during periods of constant operation. A driver will keenly feel torque shocks which occur at the operational changes, and therefore, the drive feeling is degraded with the durability of the switching valves being decreased.

SUMMARY OF THE INVENTION

An object of the invention is to provide an internal combustion engine with a dual turbocharger system wherein the frequency of the operational change between the "one-turbocharger-operation" and the "two-turbocharger-operation" is decreased, and therefore, the frequency of occurrence of torque shock is also decreased.

The above-described object can be attained by an internal combustion engine with a dual turbocharger system of the present invention by providing a multi-cylinder internal combustion engine having an exhaust outlet and an air outlet, a first and a second turbocharger arranged in parallel with each other with respect to the engine and each including a turbine and a compressor driven by the turbine, an intake switching valve installed downstream of the second turbocharger compressor and an exhaust switching valve installed downstream of the second turbocharger turbine, means for measuring an engine speed, means for measuring an intake air quantity, decision means operatively connected with the intake air quantity measuring means, the engine speed measuring means, the intake switching valve and the exhaust switching valve and serving to change an engine operation from a "one-turbocharger-operation" to a "two-turbocharger-operation" on the basis of an intake air quantity, and serving to change the engine operation from the "two-turbocharger-operation" to "one-turbocharger-operation" on the basis of an engine speed.

In the above-described internal combustion engine with a dual turbocharger system, after the engine operation enters the "two-turbocharger-operation" range, the "two-turbocharger-operation" is maintained independently of the change of the intake air quantity so long as the engine speed does not decrease to a speed below the predetermined engine speed. As a result, the frequency of the change between the "one-turbocharger-operation" and the "two-turbocharger-operation" during acceleration from a small intake air quantity is greatly decreased, and the frequency at which the resultant torque shock occurs is likewise reduced. In addition, since the number of times those valves are opened and closed, the durability of the switching valves is enhanced. Also, during high engine speed conditions, since the engine is operated under the "two-turbocharger-operation," independently of the intake air quantity or engine load, the frequency of the change between the "one-turbocharger-operation" and the "two-turbocharger-operation" is suppressed.

BRIEF DESCRIPTION OF THE DRAWINGS

The above described object and other objects, features, and advantages of the present invention will become apparent and will be more readily appreciated from the following detailed description of the preferred embodiments of the invention taken in conjunction with the accompanying drawings, in which.

DETAILED DESCRIPTION OF THE PREFERRED EMBODIMENTS

Figure 5:
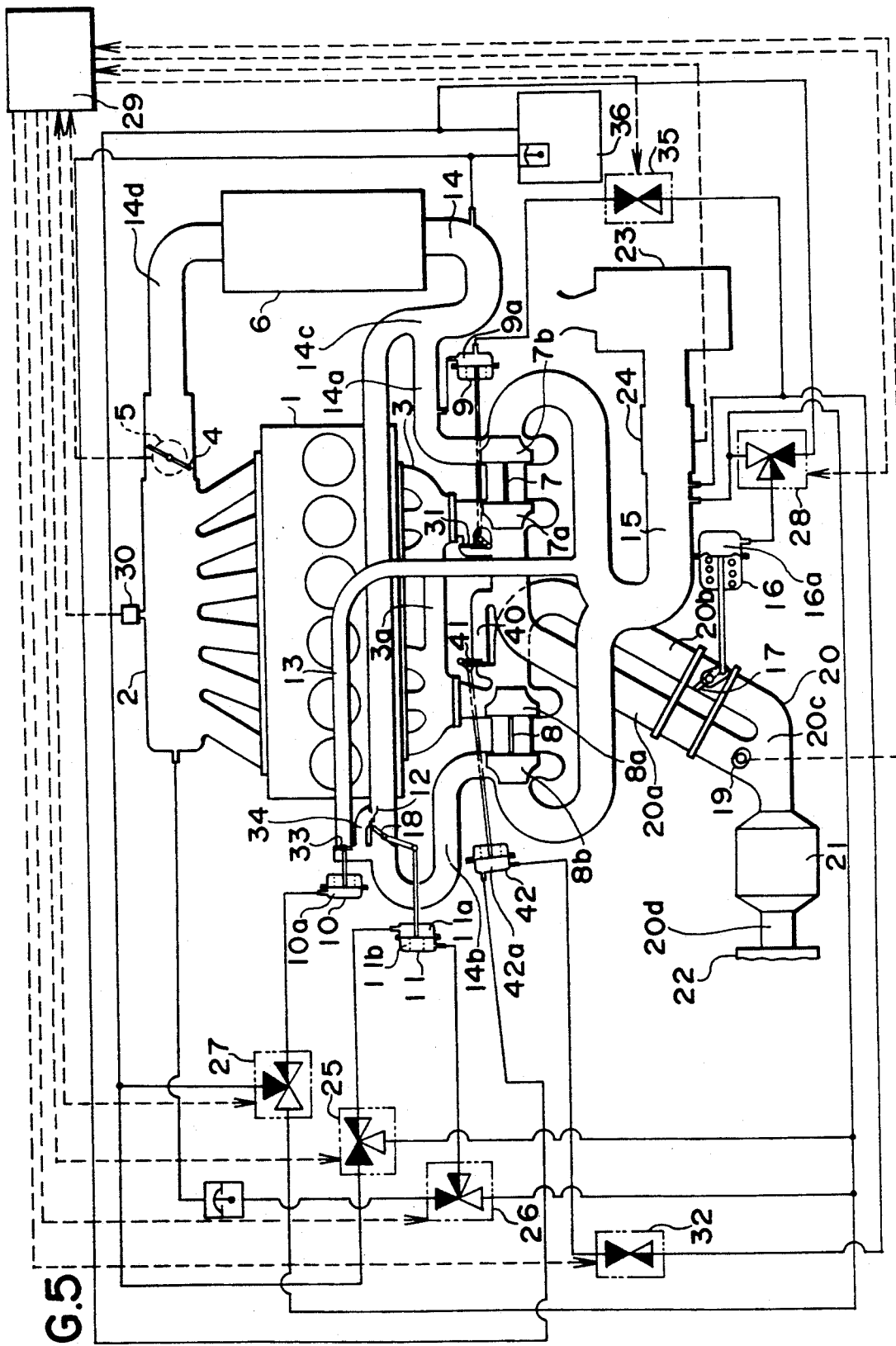
FIG. 5 is schematic view of an internal combustion engine with a dual turbocharger system in accordance with the first embodiment of the invention.
Figure 8:
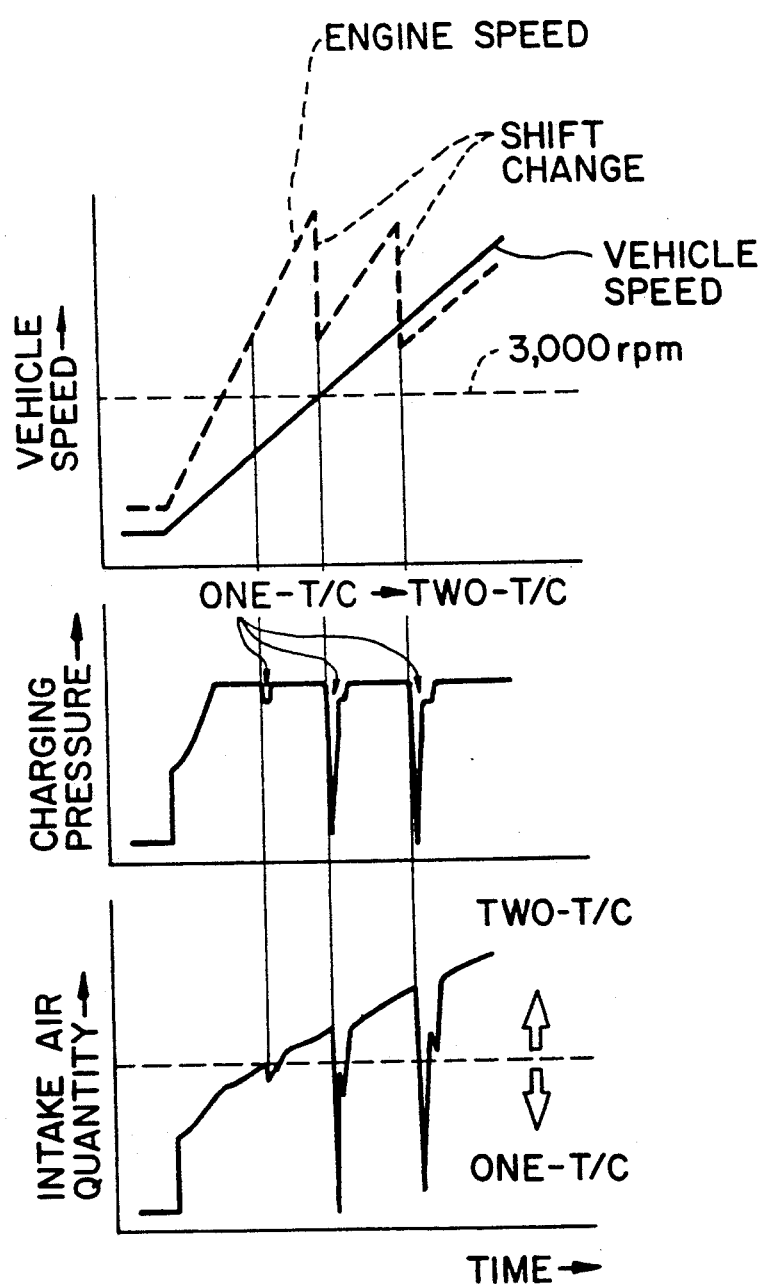
FIG. 8 is a graphical representation of a vehicle speed, a charging pressure, and an intake air quantity versus a time map illustrating problems existing in the case where change between the "one-turbocharger-operation" and the "two-turbocharger-operation" is executed on the basis of an intake air quantity only.

As illustrated in FIG. 5, an internal combustion engine with a dual turbocharger system in accordance with a first embodiment of the present invention includes a multi-cylinder engine, for example, a six-cylinder internal combustion engine 1 with an air intake and an exhaust outlet. The cylinders of the engine 1 are grouped into two groups. An exhaust manifold 3 is connected with the engine exhaust outlets and includes a first portion connected with a first group of engine cylinders and a second portion connected with a second group of engine cylinders. The first and second portions of the exhaust manifold 3 communicate with each other via a connecting conduit 3a.

A first turbocharger 7 and a second turbocharger 8 are provided so as to be in parallel with each other with respect to the engine 1. The first turbocharger 7 is operated throughout all intake air quantities, and as a rule, the second turbocharger is operated only at large intake air quantities. The first turbocharger 7 includes a turbine 7a and a compressor 7b driven by the turbine 7a. Similarly, the second turbocharger 8 includes a turbine 8a and a compressor 8b driven by the turbine 8a. The turbine 7a is connected with the first portion of the exhaust manifold 3 and the turbine 8a is connected with the second portion of the exhaust manifold 3. As a result, the first and second turbines 7a and 8a are connected with the engine exhaust outlet via the exhaust manifold 3. On the other hand, the compressor 7b and the compressor 8b are connected with the air intake of the engine 1 via an intake line.

The intake line connected with the engine air intake includes a first intake passage 15 positioned upstream of the compressors 7b and 8b and a second intake passage 14 positioned downstream of the compressors 7b and 8b. Further, the second intake passage 14 includes a first intake conduit 14a located downstream of and connected with the compressor 7b, a second intake conduit 14b located downstream of and connected with the compressor 8b, a connecting portion 14, where the first intake conduit 14a and the second intake conduit 14b join each other, and a common intake conduit 14d connecting the connecting portion 14c with the engine air intake. In the first intake passage 15, an air cleaner 23 and an air flow meter 24 are installed in that order in an intake air flow direction. An intercooler 6, a throttle valve 4, and a surge tank 2 are also installed, in the intake air flow direction, respectively, in the common intake conduit 14d.

An exhaust line 20, connected to the engine exhaust outlets, includes a first exhaust conduit 20a connected to the first portion of the exhaust manifold 3, in which the turbine 7a is installed, a second exhaust conduit 20b connected to the second portion of the exhaust manifold 3, in which the turbine 8a is installed, a connecting portion 20c where the first conduit 20a and the second exhaust conduit 20b join each other, and an exhaust pipe 20d located downstream of and connected to the connecting portion 20c. In the exhaust pipe 20d, a catalytic converter 21 and an exhaust muffler 22 are installed in an exhaust gas flow direction, respectively. Further, at the connecting portion 20c or in the vicinity of the connecting portion 20c, an oxygen sensor 19 is installed.

For the purpose of switching the operation between a "one-turbocharger-operation", in which only the first turbocharger 7 is operated, and a "two-turbocharger-operation", in which both the first turbocharger 7 and the second turbocharger 8 are operated, an exhaust switching valve 17 is installed in the second exhaust conduit 20b downstream of the turbine 8a, and an intake switching valve 18 is installed in the second intake conduit 14b downstream of the compressor 8b. When both the exhaust switching valve 17 and the intake switching valve 18 are closed, the operation of the second turbocharger 8 is stopped and only the first turbocharger 7 is in operation. In contrast, when both the exhaust switching valve 17 and the intake switching valve 18 are opened, both the first turbocharger 7 and the second turbocharger 8 are in operation.

For the purpose of minimizing a shock which typically accompanies the transition from the "one-turbocharger-operation" to the "two-turbocharger-operation", the second turbocharger 18 should be run-up before it is fully rotated. In the conventional turbocharged engine, this running-up of the second turbocharger 8 is achieved by partially opening the exhaust switching valve. In the present invention, however, an exhaust bypass conduit 40 is provided bypassing the exhaust switching valve 17, and the running-up of the second turbocharger 8 is achieved by opening an exhaust bypass valve 41 installed in the exhaust bypass conduit 40. More particularly, when the exhaust bypass valve 41 is opened, a relatively small amount of exhaust gas flows through the exhaust bypass conduit 40 such that the second turbocharger 8 can be run-up. When the exhaust switching valve 17 is opened, the rotational speed of the second turbocharger 8 is increased from a run-up rotational speed and not from a standstill whereby the transition shock is effectively suppressed.

When the second turbocharger 8 is preliminarily rotated and the intake switching valve 18 is closed, a portion of the pressurized air located in the second intake conduit 14$b$ between the compressor 8$b$ and the intake switching valve 18, will leak through the compressor 8$b$ and flow to a portion of the intake conduit upstream of the compressor 8$b$. Following which, this same air will then again be driven by the compressor 8$b$ and compressed into the portion of the intake conduit downstream of the compressor 8$b$. This leakage and re-pressurization of the intake air repeats continually and undesirably increases the temperature of the intake air and thus, the temperature of the impeller of the compressor 8$b$ itself. To prevent this compressed air from such temperature increases, an intake bypass conduit 13 is provided to bypass the compressor 8$b$ of the second turbocharger 8. More particularly, the intake bypass conduit 13 connects the portion of the second intake conduit 14$b$ positioned between the compressor 8$b$ and the intake switching valve 18 with the first intake passage 15 upstream of the compressors 7$b$ and 8$b$. An intake bypass valve 33 is installed in, and is adapted to open and close, the intake bypass conduit 13. When the second turbocharger 8 is preliminarily rotated, the intake bypass valve 33 is opened to minimize the intake air temperature increase.

An intake switching valve bypass conduit 34 may be provided to connect a portion of the second intake conduit 14$b$ positioned upstream of the intake switching valve 18 with a portion of the second intake conduit 14$b$ positioned downstream of the intake switching valve 18 to bypass the intake switching valve 18. A check valve 12 is installed in the intake switching valve bypass conduit 34. The check valve 12 permits the intake air to flow in the direction from the portion of the second intake conduit 14$b$ positioned upstream of the intake switching valve 18 toward the portion of the second intake conduit 14$b$ positioned downstream of the intake switching valve 18. As a result, when the intake switching valve 18 is closed and the compressor outlet pressure of the second turbocharger 8 grows to exceed a compressor outlet pressure of the first turbocharger 7, the check valve 12 opens the bypass conduit 34 and permits the intake air to flow through the check valve 12. Further, the turbine 7$a$ is provided with a waste gate valve 31. A positive pressure tank 36 is also provided so as to be connected with a portion of the common intake conduit 14$d$ upstream of the intercooler 6 and to hold a charging pressure therein.

Various actuators are provided to operate the above-described valves. More particularly, the waste gate valve 31 is operated by an actuator 9, the intake bypass valve 33 is operated by an actuator 10, the intake switching valve 18 is operated by an actuator 11, the exhaust switching valve 17 is operated by an actuator 16, and the exhaust bypass valve 41 is operated by the actuator 42. Each of these actuators comprises a single diaphragm-type actuator.

Various three-way or two-way solenoid valves 25, 26, 27, 28, 32 and 35 are provided to switch on and off the actuators 9, 10, 11, 16, and 42. These solenoid valves 25, 26, 27, 28, 32 and 35 operate according to the instructions from an engine control computer 29. In this instance, either one of "ON" of the three-way solenoid valve 25 or "ON" of the three-way valve 26 actuates the actuator 11 to open the intake switching valve 18, and either one of "OFF" of the three-way solenoid valve 25 or "OFF" of the three-way solenoid valve 26 actuates the actuator 11 to close the intake switching valve 18. More particularly, the intake air switching valve operating means includes the diaphragm actuator 11, the three-way solenoid valve 25, and the three-way solenoid valve 26. The diaphragm actuator 11 includes a diaphragm operatively coupled to the intake switching valve 18, a first chamber 11$a$ on one side of the diaphragm, and a second chamber 11$b$ on another side of the diaphragm. The solenoid valve 25 is connected to the first chamber 11$a$ and is adapted to switch between conducting a positive pressure from the positive pressure tank 36 into the first chamber 11$a$ at large intake air quantities to open the intake switching valve 18 and conducting an atmospheric pressure into the first chamber 11$a$ at small to medium intake air quantities and at small to medium engine speeds to close the intake switching valve 18. The three-way solenoid valve 26 is connected to the second chamber 11$b$ and is adapted to switch between conducting an atmospheric pressure into the second chamber 11$b$ at high engine loads to close the intake switching valve 18 and conducting a negative pressure from the surge tank 2 into the second chamber 11$b$ at low engine loads to open the intake switching valve 18 despite the small to medium intake air quantities.

Similarly, "ON" of the three-way solenoid valve 28 actuates the actuator 16 to open the exhaust switching valve 17, and "OFF" of the three-way solenoid valve 28 actuates the actuator 16 to close the exhaust switching valve 17. "ON" of the three-way solenoid valve 27 actuates the actuator 10 to close the intake bypass valve 33, and "OFF" of the three-way solenoid valve 27 actuates the actuator 10 to open the intake bypass valve 33. "ON" of the two-way solenoid valve 32 which may comprise a duty control valve actuates the actuator 42 to open the exhaust bypass valve 41, and "OFF" of the two-way solenoid valve 32 actuates the actuator 42 to close the exhaust bypass valve 41. Further, the actuator 16 includes a diaphragm chamber 16$a$, the actuator 10 includes a diaphragm chamber 10$a$, the actuator 11 includes diaphragm chambers 11$a$ and 11$b$, the actuator 42 includes a diaphragm chamber 42$a$, and the actuator 9 includes a diaphragm chamber 9$a$.

Various sensors for sensing the engine operating conditions are provided and the outputs of the sensors are fed to the engine control computer 29. More particularly, the various sensors include an intake pressure sensor 30, a throttle opening degree detecting sensor 5, an intake air quantity detecting sensor such as an air flow meter 24, the aforementioned oxygen sensor 19, an engine speed sensor or crank angle sensor (not shown), and a vehicle speed sensor (not shown).

Figure 1:
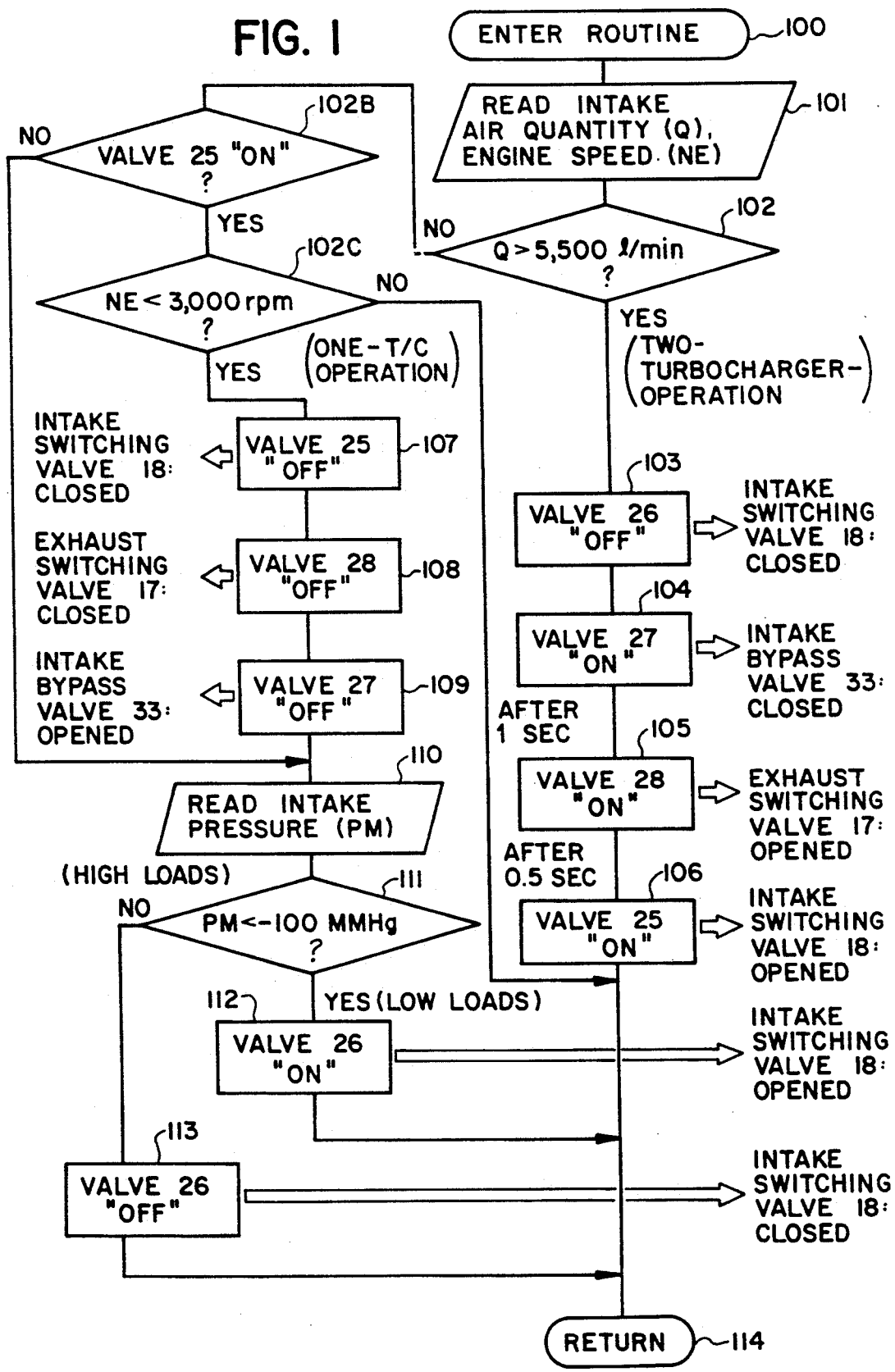
FIG. 1 is a flow chart illustrating an operation control of the internal combustion engine with a dual turbocharger system including a control for an operation change between a "one-turbocharger-operation" and a "two-turbocharger-operation" in accordance with a first embodiment of the invention.
Figure 2:
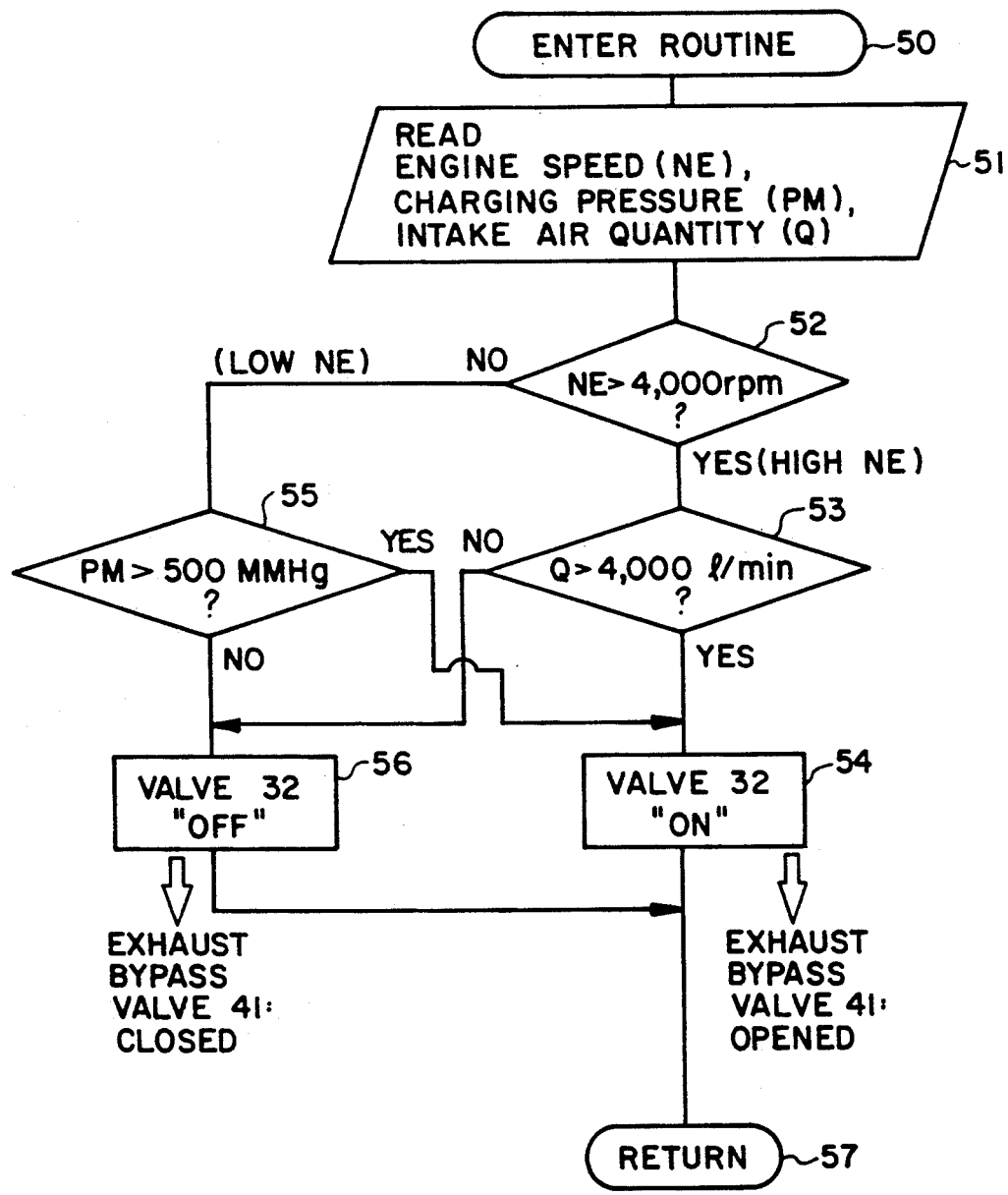
FIG. 2 is a flow chart illustrating an operation control of a exhaust bypass valve installed in the internal combustion engine with a dual turbocharger system of the first embodiment of the invention.

The engine control computer 29 includes a central processor unit (CPU), a read-only memory (ROM), a random access memory (RAM), and input and output interface (I/O interface), and an analog/digital convertor (A/D convertor) like a usual microcomputer. FIGS. 1 and 2 illustrate a program according to which the turbocharged internal combustion engine is operated. The programs of FIGS. 1 and 2 are stored in the ROM and are fed into the CPU where the routines are executed to operate the above-described valves and actuators.

Control structures and operation of the turbocharged engine will now be explained with reference to FIGS. 1 and 2. The routine of FIG. 2 is entered at step 50. Then, at step 51, the current engine speed NE which is an output signal of the engine speed sensor, the current intake air quantity Q, which is an output signal of the air flow meter 24, and the current charging pressure, which is an output signal of the intake pressure sensor 30, are read, respectively. Then, the routine proceeds to a step 52, where whether or not the current engine speed NE is higher than a predetermined engine speed, for example 4,000 rpm, is determined. In this instance, the step 52 constitutes engine speed determining means.

When the engine speed is determined by the engine speed determining means to be equal to or lower than the predetermined engine speed at step 52, the routine proceeds to a step 55, where whether or not the current intake pressure PM is higher than a predetermined charging pressure, for example 500 mm HG, is determined. In this instance, the step 55 constitutes charging pressure determining means. When the charging pressure PM is determined by the charging pressure determining means to be higher than the predetermined charging pressure at step 55, the routine proceeds to a step 54, where the solenoid valve 32 is switched to "ON" so that the exhaust bypass valve 41 is opened and the second turbocharger 8 begins to be run-up. When the charging pressure PM is determined to be equal to or lower than the predetermined charging pressure at step 55, the routine proceeds to a step 56, where the solenoid valve 32 is switched to "OFF" so that the exhaust bypass valve 41 is closed.

When the engine speed is determined by the engine speed determining means to be higher than the predetermined engine speed at step 52, the routine proceeds to a step 53, where whether or not the current intake air quantity Q is larger than a predetermined intake air quantity, for example 4,000 l/min, is determined. In this instance, the step 53 constitutes intake air quantity determining means. When the intake air quantity Q is determined to be larger than the predetermined intake air quantity at step 53, the routine proceeds to a step 54 and the exhaust bypass valve 41 is opened. When the intake air quantity Q is determined to be equal to or smaller than the predetermined intake air quantity at step 53, the routine proceeds to step 56 and the exhaust bypass valve 41 is closed. The step 54 and the step 56 constitute exhaust bypass valve operating means. From the exhaust bypass valve operating means, the routine proceeds to a returning step 57 and returns to the routine of FIG. 1.

The routine of FIG. 1 is entered at step 100. At step 101, the current intake air quantity Q, which is an output signal from the air flow meter 24, and the current engine speed NE are read. Then, at step 102A, it is determined whether or not the intake air quantity Q is larger than a predetermined intake air quantity, for example 5,500 l/min, that is, whether or not the current engine operational condition is a condition to be operated under "two-turbocharger-operation". More particularly, when Q is larger than 5,500 l/min, the current condition is deemed to be a condition causing a "two-turbocharger-operation". However, since there is a time lag for the charging pressure to reach 500 mm Hg after the valves 17 and 18 are switched, the actual switching from the "one-turbocharger-operation" to the "two-turbocharger-operation" will not occur until about 6,000 l/min.

When the current engine operational condition is determined to be a condition causing a "two-turbocharger-operation" at step 102A, the routine proceeds to a step 103. At step 103, in the case where the intake switching valve 18 is at a partially opened state, the three-way solenoid valve 26 is switched to "OFF" to close the intake switching valve 18. Then, at step 104, the three-way solenoid valve 27 is switched to "ON" to introduce the intake pressure at a portion of the intake conduit downstream of the compressor (the charging pressure) into the diaphragm chamber 10a of the actuator 10 thereby closing the intake bypass valve 33.

Then, the routine further proceeds to a step 105. At step 105, after a short period of time necessary to run-up the second turbocharger 8, for example one second, after the switching-on of the three-way solenoid valve 27, the three-way solenoid valve 28 is switched to "ON" to introduce the charging pressure into the diaphragm chamber 16a of the actuator 16 thereby opening the exhaust switching valve 17. If the compressor outlet pressure of the second turbocharger 8 increases over that of the compressor outlet pressure of the first turbocharger 7, the charging air pressurized by the second turbocharger 8 passes through the check valve 12 and is supplied to the engine 1. Then, at step 106, after a short period of time, for example, 0.5 seconds after the switching-on of the three-way solenoid valve 28, the three-way solenoid valve 25 is switched to "ON" to introduce the charging pressure into the diaphragm chamber 11a of the actuator 11 thereby opening the intake switching valve 18. In this state, both the first turbocharger 7 and the second turbocharger 8 are in operation. Then, the routine proceeds to a step 114 and returns. In the above-described routine, the step 102A constitutes the decision means serving to change the engine operation from the "one-turbocharger-operation" to the "two-turbocharger-operation" on the basis of an intake air quantity.

When the current intake air quantity Q is determined to be equal to or less than the predetermined intake air quantity at the aforementioned step 102A, the routine proceeds to a step 102B, where it is determined whether or not at least one of the three-way solenoid valve 25 or the three-way solenoid valve 28 is in the state of "ON". When the solenoid valve 25 or 28 is determined to be in the state of "OFF", the engine is in the "one-turbocharger-operation" and does not need to be switched to that "one-turbocharger-operation", so that the routine proceeds to a step 110 skipping the switching routines 107, 108, and 109. In contrast, when the solenoid valve 25 or 28 is determined to be in the state of "ON" at step 102B, the engine is in the "two-turbocharger-operation" and it is necessary to investigate whether the engine operation should be changed to "one-turbocharger-operation". Therefore, the routine proceeds to a step 102C, where it is determined whether or not the current engine speed NE is less than a predetermined engine speed, for example 3,000 rpm. When the engine speed NE is determined to be equal to or greater than 3,000 rpm, the routine proceeds to the return step 114 so that the "two-turbocharger-operation" is maintained independently of the intake air quantity. Therefore, when a gear position change is performed during acceleration, the switching valves 25 and 28 are not closed so long as the gear position change is performed at an engine speed above 3,000 rpm. By contrast, when the engine speed NE is determined to be less than 3,000 rpm at step 102C, the routine proceeds to a step 107 so that the switching valves 18 and 17 are closed and the engine operation is changed to the "one-turbocharger-operation". In the above-described routine, the steps 10B and 102C constitute the decision means serving to change the engine operation from the "two-turbocharger-operation" to the "one-turbocharger-operation" on the basis of an engine speed.

When the routine proceeds to step 107, the three-way valve 25 is switched to "OFF" to close the intake switching valve 18. Then, at step 108, the three-way solenoid valve 28 is switched to "OFF" to close the exhaust switching valve 17. At step 109, the three-way solenoid valve 27 is switched to "OFF" to open the intake bypass valve 33. Following steps 107, 108 and 109, the "one-turbocharger-operation" is produced. In this state, even if the second turbocharger 8 is rotated by the engine exhaust pressure, the air pressurized by the compressor 8b returns to the first intake passage 15 through the intake bypass conduit 13.

Then, the routine proceeds to a step 110 where the intake gas pressure PM is read. This reading of the intake gas pressure PM may be performed at the previous step 101. Then, the routine proceeds to a step 111 where it is determined whether or not the engine load is low, for example, whether or not the intake pressure PM is smaller than −100 mm Hg. When the intake pressure PM is determined to be equal to or larger than −100 mm Hg and therefore, the engine load is high, the routine proceeds to a step 113 where the three-way solenoid valve 26 is switched to "OFF" to close the intake switching valve 18. In this state, because the intake switching valve 18 is closed and the exhaust switching valve 17 is closed, the turbocharged system operates according to the "one-turbocharger-operation" and a good torque response is obtained.

When the PM is determined to be smaller than −100 mm Hg and, therefore, the engine load is determined to be low at step 111, the routine proceeds to a step 112. At step 112, the three-way solenoid valve 26 is switched to "ON" to introduce the negative pressure at the surge tank 2 into a diaphragm chamber 11b of the actuator 11 thereby opening the intake switching valve 18. In this state, because the exhaust switching valve 17 is closed, the second turbocharger 8 is not driven, and only the first turbocharger 7 is in operation. However, since the intake switching valve 18 is opened, the intake air can be sucked through both the first intake conduit 14a and the second intake conduit 14b. As a result, a great amount of intake air can be supplied to the engine 1 and the acceleration characteristic from a low engine load is improved. Then, the routine proceeds to step 114 and returns.

Figure 4:
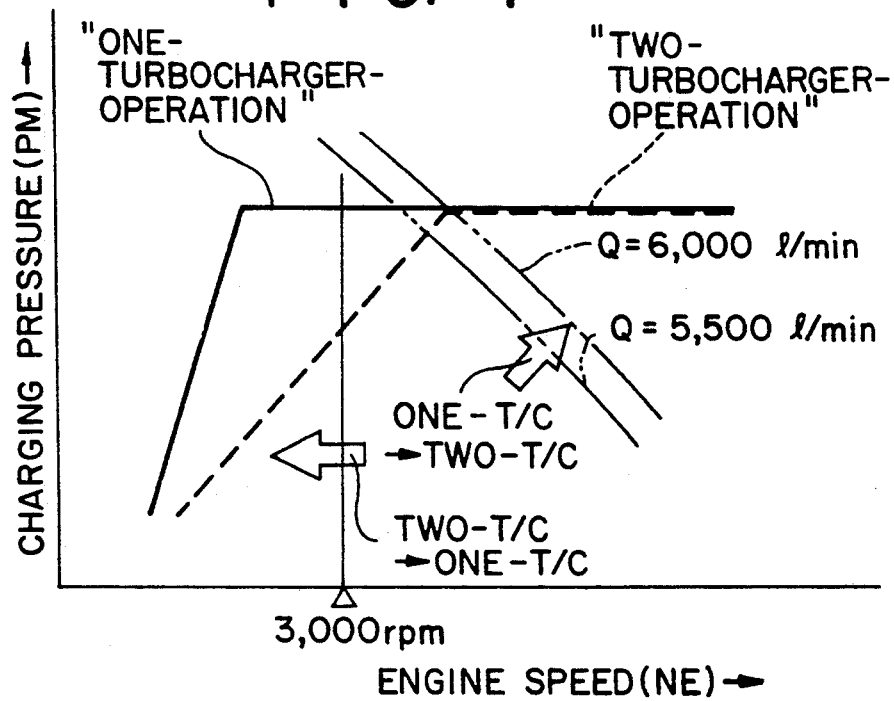
FIG. 4 is a graphical representation of a charging pressure versus an engine speed map of the internal combustion engine with a dual turbocharger system in accordance with the first embodiment of the invention.
Figure 6:
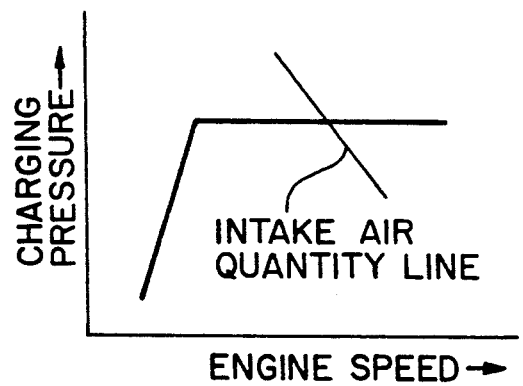
FIG. 6 is a graphical representation of a charging pressure versus an engine speed map in a case where the change between the "one-turbocharger-operation" and the "two-turbocharger-operation" is executed on the basis of an intake air quantity only.
Figure 7:
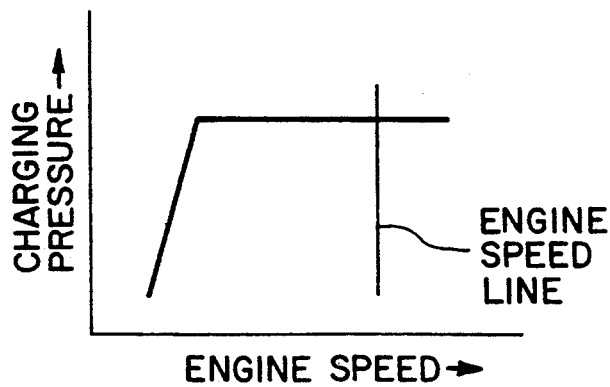
FIG. 7 is a graphical representation of a charging pressure versus an engine speed map in a case where the change between the "one-turbocharger-operation" and the "two-turbocharger-operation" is executed on the basis of an engine speed only.

FIG. 4 illustrates a switching of the engine operation in accordance with the present invention between the "one-turbocharger-operation" and the "two-turbocharger-operation". As shown in FIG. 4, the switch of the engine operation from the "one turbocharger-operation" to the "two-turbocharger-operation" is performed on the basis of an intake air quantity by means of the step 102A of FIG. 1. In contrast, switching of the engine operation from the "two-turbocharger-operation" to the "one-turbocharger-operation" is performed on the basis of an engine speed by means of the steps 102B and 102C. More particularly, even if the intake air quantity is equal to or less than 5,500 1/min, when the engine speed is equal to or greater than 3,000 rpm, the "two-turbocharger-operation" is maintained. Therefore, the switching between the "one-turbocharger-operation" and the "two-turbocharger-operation", which occurs at every gear position change of the transmission during acceleration in the conventional turbocharged engine, does not occur in the turbocharged engine in accordance with the present invention, if the engine speed is equal to or greater than 3,000 rpm. As a result, a sudden decrease in the charging pressure which occurs during the operational change, and the torque shock caused by this charging pressure decrease is effectively suppressed, so that the drive feeling during acceleration is greatly improved. Further, the decrease in number of opening and closing of the intake switching valve 18 and the exhaust switching valve 17 will increase the durability of these valves.

Further, in a high engine speed condition above the predetermined engine speed (for example, 3,000 rpm), the engine is operated under the "two-turbocharger-operation". In this instance, if the engine speed does not decrease to a speed less than 3,000 rpm, the "two-turbocharger-operation" is maintained, even though the engine load or intake air quantity Q decreases to a level lower than 5,500 1/min. This non-switching during periods of high engine speed operation greatly improves the drive feeling at the constant, high speed operation as well as improving the durability of the switching valves 17 and 18. In this instance, since the intake air quantity is not small at high engine speeds, the time lag is small and the response characteristics are well maintained, even though the engine continues to be operated under the "two-turbocharger-operation".

Figure 3:
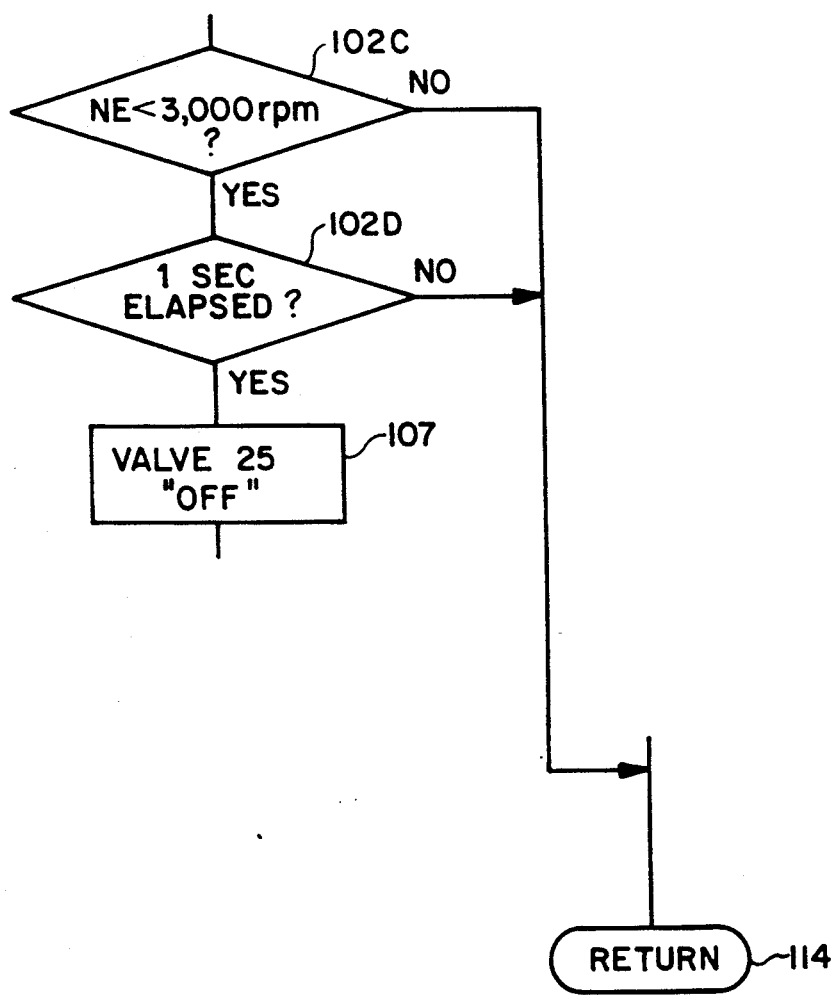
FIG. 3 is a flow chart illustrating a control for an operation change between a "one-turbocharger-operation" and a "two-turbocharger-operation" in accordance with a second embodiment of the invention.
Figure 9:
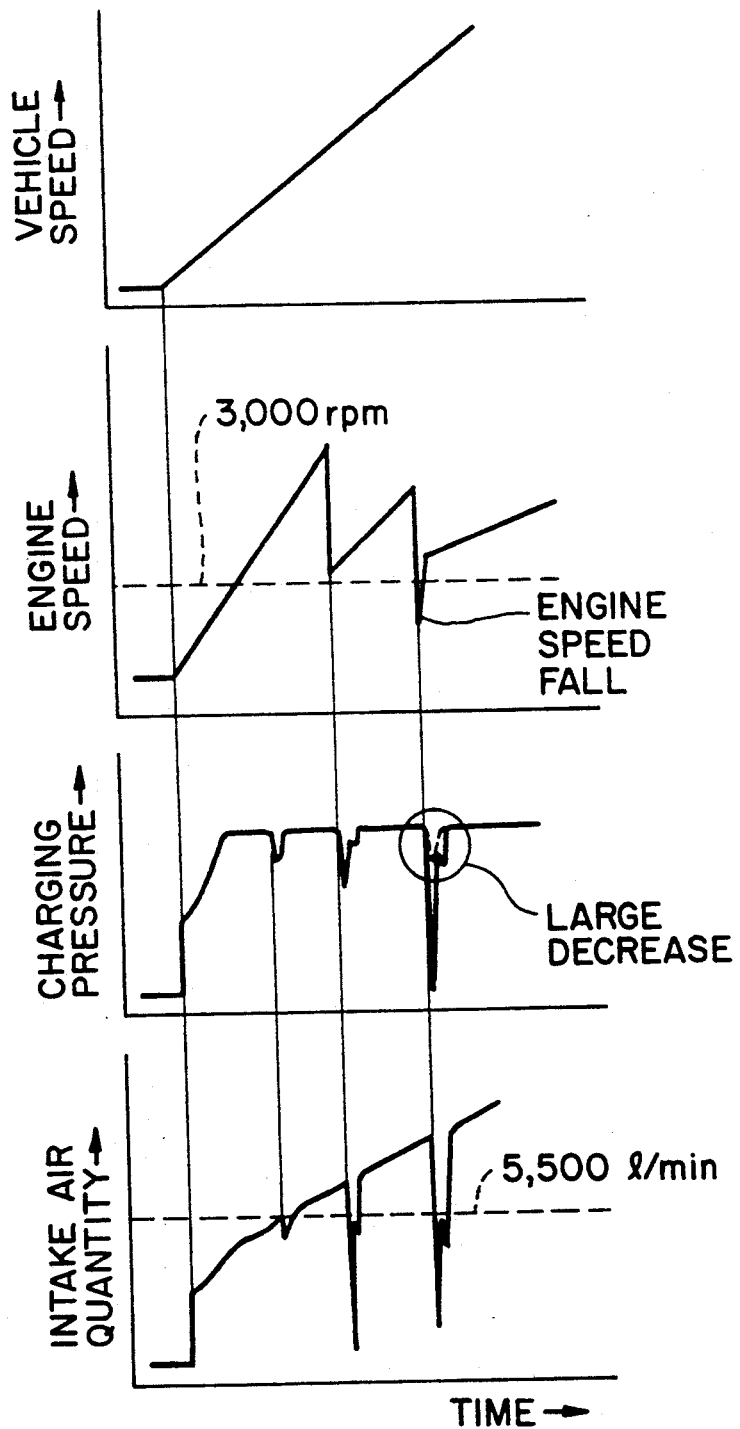
FIG. 9 is a graphical representation of a vehicle speed, an engine speed, a charging pressure, and an intake air quantity versus a time map illustrating problems existing in the case where the engine operation is changed from the "two-turbocharger-operation" to the "one-turbocharger-operation" without any delay when the engine speed decreases to a speed below a predetermined engine speed.
Figure 10:
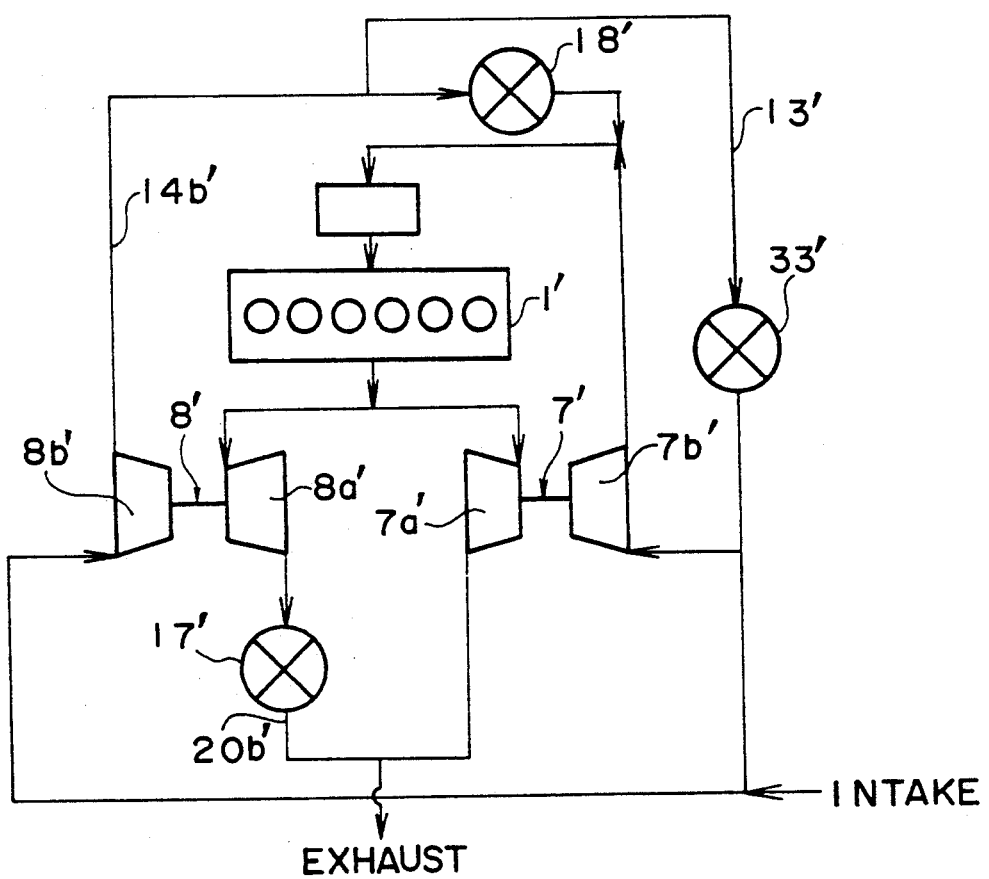
FIG. 10 (PRIOR ART) is a system diagram of a conventional dual turbocharger system.

FIG. 3 illustrates a partial flow chart in accordance with a second embodiment of the invention which is an improvement of the first embodiment. As illustrated by a full line in FIG. 9, if the engine speed happens to decrease momentarily to a speed lower than the predetermined engine speed (for, example, 3,000 rpm) at a gear change during acceleration, the "two-turbocharger-operation" changes to the "one-turbocharger-operation" and then the "one-turbocharger-operation" changes to the "two-turbocharger-operation" with subsequent acceleration, thereby causing a shock to occur. The second embodiment aims to solve the problem of the first embodiment.

More particularly, in the second embodiment, a delay means is provided which serves to delay for a predetermined period of time the change from the "two-turbocharger-operation" to the "one-turbocharger-operation" caused by commands of the decision means. The predetermined period of time can be, for example, 1 sec. As illustrated in FIG. 3, the delay means comprises a step 102D which is to be inserted between the step 102B and the step 107 of FIG. 1. More particularly, when the engine speed NE is determined to be less than 3,000 rpm at step 102C, the routine proceeds to step 102D, where it is determined whether or not one second has elapsed after the engine speed NE changed from a speed above 3,000 rpm to a speed below 3,000 rpm. If the engine speed decrease recovers to a speed above 3,000 rpm within one second, such a speed decrease is no more than a momentary one which typically can accompany a gear change so that the routine proceeds to the return step 114 and the "two-turbocharger-operation" is held. Only when the engine speed decrease continues for more than one second, the routine proceeds to step 107 where the "two-turbocharger-operation" is changed to the "one-turbocharger-operation". Due to the provision of the delay means, the operational change of the turbochargers occurring at a gear position change of the transmission under acceleration and the resultant torque shock due to that change are avoided as illustrated by a broken line in the charging pressure versus time characteristic of FIG. 9. As a result, the drive feeling and the durability of the switching valves are further improved as compared with the first embodiment. With respect to other structures and operation, those of the first embodiment should be understood to be applicable to those of the second embodiment.

In accordance with the present invention, the following advantages are obtained.

First, because the change from the "one-turbocharger-operation" to the "two-turbocharger-operation" is performed on the basis of an intake air quantity and the change from the "two-turbocharger-operation" to the "one-turbocharger-operation" is performed on the basis of an engine speed, the operational change between the "one-turbocharger-operation" and the "two-turbocharger-operation", which occurs at every gear position change of the transmission under acceleration in the conventional turbocharged engine, is almost always prevented.

Second, due to the prevention of unnecessary operational changes back to "one-turbocharger-operation," the torque shocks associated with these operational changes are also prevented and the drive feeling is thereby improved.

Third, due to the minimization of occurrence of the operational changes of the turbochargers, the frequency at which the intake and exhaust switching valves are opened and closed is minimized and the durability of the switching valves is greatly improved.

Fourth, if the delay means is further provided, the occurrence of operational changes of the turbochargers during the gear changes of the transmission under acceleration can be avoided, and further improvement of drive feeling and the durability of the switching valves can be expected.

Although only a few embodiments of the invention have been described in detail above, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An internal combustion engine with a dual turbocharger system comprising:
    a multi-cylinder internal combustion engine having an air intake and an exhaust outlet;
    a first and a second turbocharger arranged in parallel with each other with respect to the engine, each including a turbine and a compressor, the turbine being connected with the exhaust outlet of the engine and the compressors being connected with the air intake of the engine;
    an intake switching valve installed downstream of the second turbocharger compressor and an exhaust switching valve installed downstream of the second turbocharger turbine, means for opening the intake switching valve and the exhaust switching valve whereby both the first turbocharger and the second turbocharger operate to produce a "two-turbocharger-operation" and for closing the intake switching valve and the exhaust switching valve whereby only the first turbocharger operates to produce a "one-turbocharger-operation";
    means for measuring an engine speed;
    means for measuring an intake air quantity; and
    decision means operatively connected with the intake air quantity measuring means, the engine speed measuring means, and the means for opening and closing the intake and exhaust switching valves and serving to change an engine operation from the "one-turbocharger-operation" to the "two-turbocharger-operation" on the basis of an intake air quantity and serving to change the engine operation from the "two-turbocharger-operation" to the "one-turbocharger-operation" on the basis of an engine speed.

2. An internal combustion engine with a dual turbocharger system according to claim 1, wherein the first decision means serves to open the intake switching valve and the exhaust switching valve whenever the intake air quantity changes from a quantity less than a predetermined intake air quantity to a quantity greater than the predetermined intake air quantity.

3. An internal combustion engine with a dual turbocharger system according to claim 2, wherein the predetermined intake air quantity is substantially 5,500 l/min.

4. An internal combustion engine with a dual turbocharger system according to claim 1, wherein the decision means serves to close the intake switching valve and the exhaust switching valve whenever the engine speed changes from a speed greater than a predetermined engine speed to a speed less than the predetermined engine speed.

5. An internal combustion engine with a dual turbocharger system according to claim 4, wherein the predetermined engine speed is substantially 3,000 rpm.

6. An internal combustion engine with a dual turbocharger comprising:
    a multi-cylinder internal combustion engine with an air intake and at least one exhaust outlet, the engine including a first and a second group of cylinders;
    an exhaust manifold connected with the engine exhaust outlet, the exhaust manifold including a first portion connected to the first group of the cylinders and a second portion connected to the second group of the cylinders, the first portion and the second portion of the exhaust manifold communicating with each other by a connecting conduit;
    a first and a second turbocharger arranged in parallel with each other with respect to the engine, each including a turbine and a turbine driven compressor, the turbines being connected with the exhaust outlet of the engine by the exhaust manifold with the compressors being connected with the air intake of the engine;
    an intake line including a first intake conduit connected with the first turbocharger compressor, a second intake conduit connected with the second turbocharger compressor, an intake connecting portion joining the first intake conduit and the second intake conduit, an intake common conduit connecting the intake connecting portion an the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

an exhaust bypass conduit connecting a portion of the second exhaust conduit downstream of the second turbocharger turbine and upstream of the exhaust switching valve with any one of a portion of the second exhaust conduit downstream of the exhaust switching valve, the exhaust connecting portion and a portion of the first exhaust conduit downstream of the first turbocharger turbine;

an exhaust bypass valve installed in the exhaust bypass conduit and adapted to open and close the exhaust bypass conduit;

means for measuring an engine speed;

means for measuring an intake air quantity; and decision means operatively connected with the intake air quantity measuring means, the engine speed measuring means, the intake switching valve and the exhaust switching valve and serving to open the intake switching valve and the exhaust switching valve whenever the intake air quantity changes from a quantity less than predetermined intake air quantity to a quantity greater than the predetermined intake air quantity and serving to close the intake switching valve and the exhaust switching valve whenever the engine speed changes from a speed greater than a predetermined engine speed to a speed less than the predetermined engine speed.

7. An internal combustion engine with a dual turbocharger system according to claim 6, wherein the predetermined intake air quantity is substantially 5,500 1/min.

8. An internal combustion engine with a dual turbocharger system according to claim 6, wherein the predetermined engine speed is substantially 3,000 rpm.

9. An internal combustion engine with a dual turbocharger system comprising:

a multi-cylinder internal combustion engine having an air intake and an exhaust outlet;

a first and a second turbocharger arranged in parallel with each other with respect to the engine, each including a turbine and a compressor, the turbine being connected with the exhaust outlet of the engine and the compressors being connected with the air intake of the engine;

an intake switching valve installed downstream of the second turbocharger compressor and an exhaust switching valve installed downstream of the second turbocharger turbine, means for opening the intake switching valve and the exhaust switching valve whereby both the first turbocharger and the second turbocharger operate to produce a "two-turbocharger-operation" and for closing the intake switching valve and the exhaust switching valve whereby only the first turbocharger operates to produce a "one-turbocharger-operation";

means for measuring an engine speed;

means for measuring an intake air quantity;

decision means operatively connected with the intake air quantity measuring means, the engine speed measuring means and the means for opening and closing the intake and exhaust switching valves serving to change an engine operation from the "one-turbocharger-operation" to the "two-turbocharger-operation" on the basis of an intake air quantity, and serving to change the engine operation from the "two-turbocharger-operation" to the "one-turbocharger-operation" on the basis of an engine speed, the decision means further comprising delay means for delaying the change from the "two-turbocharger-operation" to the "one-turbocharger-operation" by a predetermined period of time.

10. An internal combustion engine with a dual turbocharger system according to claim 9, wherein the predetermined period of time is substantially 1 sec.

11. An internal combustion engine with a dual turbocharger comprising:

a multi-cylinder internal combustion engine with an air intake and at least one exhaust outlet, the engine including a first and second group of cylinders;

an exhaust manifold connected with the engine exhaust outlet, the exhaust manifold including a first portion connected to the first group of the cylinders and a second portion connected to the second group of the cylinders, the first portion and the second portion of the exhaust manifold communicating with each other by a connecting conduit;

a first and a second turbocharger arranged in parallel with each other with respect to the engine, each including a turbine and a turbine driven compressor, the turbines being connected with the exhaust outlet of the engine by the exhaust manifold with the compressors being connected with the air intake of the engine;

an intake line including a first intake conduit connected with the first turbocharger compressor, a second intake conduit connected with the second turbocharger compressor, an intake connecting portion joining the first intake conduit and the second intake conduit, an intake common conduit connecting the intake connecting portion an the air intake of the engine;

an exhaust line including a first exhaust conduit connected with the first portion of the exhaust manifold, in which the first turbocharger turbine is installed, a second exhaust conduit connected with the second portion of the exhaust manifold, in which the second turbocharger turbine is installed, an exhaust connecting portion where the first exhaust conduit and the second exhaust conduit join each other, and an exhaust pipe located downstream of and connected with the exhaust connecting portion;

an intake switching valve installed downstream of the second turbocharger compressor in the second intake conduit and adapted to open and close the second intake conduit;

an exhaust switching valve installed downstream of the second turbocharger turbine in the second exhaust conduit and adapted to open and close the second exhaust conduit;

an exhaust bypass conduit connecting a portion of the second exhaust conduit downstream of the second turbocharger turbine and upstream of the exhaust switching valve with any one of a portion of the second exhaust conduit downstream of the exhaust switching valve, the exhaust connecting portion and a portion of the first exhaust conduit downstream of the first turbocharger turbine;

an exhaust bypass valve installed in the exhaust bypass conduit and adapted to open and close the exhaust bypass conduit;

means for measuring an engine speed;

means for measuring an intake air quantity; and decision means operatively connected with the intake air quantity measuring means, the engine speed measuring means, the intake switching valve and the exhaust switching valve and serving to open the intake switching valve and the exhaust switching valve whenever the intake air quantity changes from a quantity less than a predetermined intake air quantity to a quantity greater than the predetermined intake air quantity and serving to close the intake switching valve and the exhaust switching valve whenever the engine speed changes from a speed greater than a predetermined engine speed to a speed less than the predetermined engine speed, the decision means further comprising delay means for delaying the closing of the intake switching valve and the exhaust switching valve by a predetermined period of time.

12. An internal combustion engine with a dual turbocharger system according to claim 11, wherein the predetermined period of time is substantially 1 sec.

* * * * *